Patented Aug. 14, 1923.

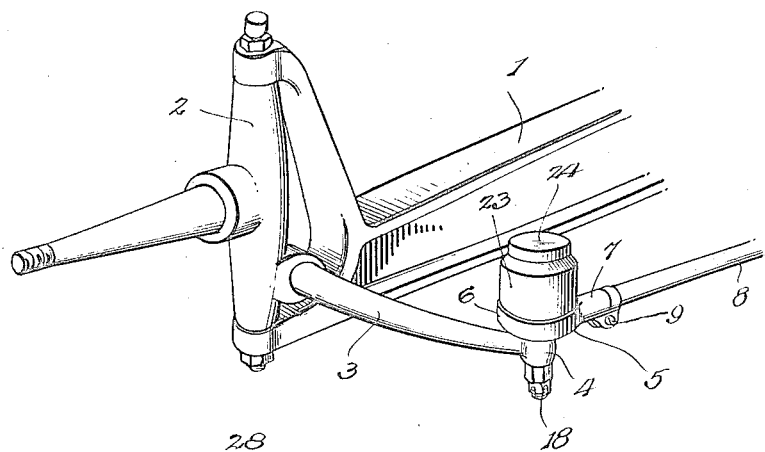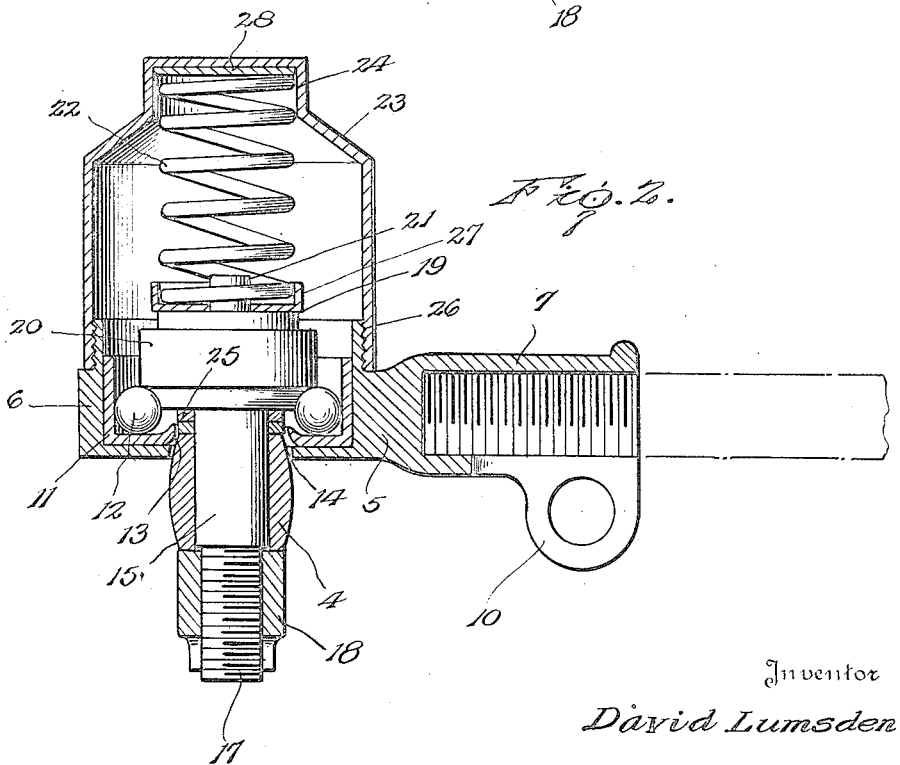

1,465,140

UNITED STATES PATENT OFFICE.

DAVID LUMSDEN, OF SIKESTON, MISSOURI.

JOINT FOR AUTOMOBILE STEERING DEVICES.

Application filed April 17, 1922. Serial No. 553,757.

*To all whom it may concern:*

Be it known that I, DAVID LUMSDEN, a citizen of the United States, residing at Sikeston, in the county of Scott and State of Missouri, have invented certain new and useful Improvements in Joints for Automobile Steering Devices, of which the following is a specification.

This invention relates to the connection between the spindle arm and the connecting rod of an automobile steering mechanism and has for its object the provision of a simple, inexpensive and efficient device whereby a joint will be provided which will withstand long-continued service or rough usage without becoming loose and by which rattling will be avoided and the steering wheels maintained in alinement. The invention is illustrated in the accompanying drawings and will be hereinafter fully set forth.

In the drawings—

Figure 1 is a perspective view of one side of an automobile steering mechanism showing my improved joint applied thereto;

Fig. 2 is a vertical section through the joint.

In the drawings, the reference numeral 1 indicates the front or steering axle of an automobile, 2 denotes the wheel-carrying spindle and 3 the spindle arm projecting rearwardly therefrom, the spindle arm being constructed with the usual eye 4 at its rear end. In carrying out my invention, I employ a head 5 which comprises a circular cup-like body 6 and a split socket or sleeve 7 projecting radially from the body 6. as shown. The socket 7 is internally threaded to be engaged by the threaded end of the connecting rod 8 and is secured firmly to said rod by a bolt or similar device 9 inserted through the depending lugs or ears 10 of the socket. Within the cup-like body 6, I tightly fit a raceway 11 containing bearing balls 12 which may be held in the raceway by retainers, as is a common practice in the construction of anti-friction bearings. The said raceway 11 is provided centrally with an opening 13 adapted to register with an opening 14 in the bottom of the body 6, and a bolt 15 is inserted downwardly through the said openings and through the eye 4, as clearly shown, the bolt having a threaded extremity 17 which receives a nut 18 adapted to be turned home against the lower side of the eye. Below the head 19 of the bolt, a cone 20 is fitted thereon and this cone bears upon the balls 12, as clearly shown in Fig. 2. Rising centrally from the head 19 is a stud 21 which serves as a centering pin for a coiled spring 22 which seats on a flanged washer 27 resting upon the head 19, the spring being held in proper position and tension by a cap 23 having a seat 24 at its upper end to receive the upper extremity of the spring, a washer 28 being fitted within the seat, as shown and as will be readily understood. Between the cone 20 and the bottom of the raceway 11, washers or collars 25 are arranged around the bolt, the number or thickness of the washers being such as will allow only a slight clearance between the bottom of the cup 6 and the top of the spindle arm. The cap 23 is internally threaded at its lower end, as indicated at 26, so as to engage over the externally threaded upper extremity of the cup-like body 6 whereby the cap will be held in place, and a non-liquid lubricant may be placed in the cup so as to lubricate the bearing and thereby insure easy movement in the joint.

In the use of certain types of light motor vehicles, the joint between the spindle arm and the connecting rod of the steering mechanism frequently becomes loose owing to the wear between the relatively moving parts, and the occupants of the vehicles are annoyed by the constant rattling sound which results. The loose joints also permit the steering wheels to get out of alinement so that steering is difficult and the comfort of the occupants of the vehicle is disturbed. By the use of my improved device, sand, dust, and other foreign substances are effectually excluded from the joint, and the provision of the antifriction bearing with constant lubrication minimizes wear so as to practically eliminate the same. The spring 22 exerts a constant yielding force upon the bearing which automatically compensates for ordinary wear, prevents the rattling, and maintains the steering wheels in alinement inasmuch as the very slight play which may possibly develop in the joint is automatically taken up. The device is very simple and may be readily applied to any vehicle now in use at a slight expense and, when in position, will not add any appreciable dead weight to the vehicle. The cap protects the lubricant and the bearing against the entrance of dust or dirt which would accumulate thereon and clog the action, the only opening being on the under side and being closely fitted with the bolt and washers while the very slight clearance around the washers is filled with a non-liquid lubricant. The bolt 15, of course, serves as the pivot about which the relative movement between the connecting rod and the spindle arm will occur and binding of these parts in changing the course of the steering wheels is avoided.

Having thus described the invention, what is claimed as new is:

1. The combination with a spindle arm, and a connecting rod of a steering mechanism, of a cup secured on the end of the connecting rod with its bottom parallel with the horizontal plane of the axis of the rod, a bearing fitted in said cup on the bottom thereof, a pivot bolt inserted vertically through said bearing and secured in the end of the spindle arm below the cup, a yieldable pressure device bearing at its lower end upon the said pivot bolt, and a retaining cap secured upon the cup and seating the upper end of the pressure device.

2. The combination with a spindle arm, and a connecting rod of a steering mechanism, of a cup secured on the end of the connecting rod and disposed above the end of the spindle arm, a bearing member secured in said cup, a pivot bolt inserted through said bearing member, the bottom of the cup and the end of the spindle arm, a coacting bearing member carried by the bolt within the cup, a nut on the lower end of the bolt bearing against the end of the spindle arm and adapted when turned home to secure the bolt in the spindle arm and the bearing members in engagement, a coiled spring resting on the head of the bolt, and a cap secured on the cup and housing said spring and provided with a seat at its upper end receiving the upper end of the spring.

In testimony whereof I affix my signature.

DAVID LUMSDEN. [L. S.]